(12) United States Patent
Yamashita et al.

(10) Patent No.: US 8,992,676 B2
(45) Date of Patent: Mar. 31, 2015

(54) INK SET AND INK JET RECORDING METHOD

(71) Applicant: Canon Kabushiki Kaisha, Tokyo (JP)

(72) Inventors: Tomohiro Yamashita, Yokohama (JP); Shin-ichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/922,137

(22) Filed: Jun. 19, 2013

(65) Prior Publication Data

US 2013/0342604 A1 Dec. 26, 2013

(30) Foreign Application Priority Data

Jun. 21, 2012 (JP) ................. 2012-139663

(51) Int. Cl.
*C09D 11/02* (2014.01)
*C09D 11/38* (2014.01)
*C09D 11/322* (2014.01)
*C09D 11/40* (2014.01)

(52) U.S. Cl.
CPC .............. *C09D 11/38* (2013.01); *C09D 11/322* (2013.01); *C09D 11/40* (2013.01)
USPC .................................... 106/31.59; 106/31.89

(58) Field of Classification Search
CPC ........................................................ C09D 11/40
USPC ........................................... 106/31.59, 31.89
See application file for complete search history.

(56) References Cited

U.S. PATENT DOCUMENTS

2005/0012796 A1* 1/2005 Doi et al. ...................... 347/100
2008/0280044 A1* 11/2008 Okamura et al. ............. 427/258

FOREIGN PATENT DOCUMENTS

| JP | 2001-335725 A | 12/2001 |
| JP | 2003-335987 A | 11/2003 |
| JP | 2004-338392 A | 12/2004 |
| JP | 2008-308664 A | 12/2008 |

* cited by examiner

*Primary Examiner* — Veronica F Faison
(74) *Attorney, Agent, or Firm* — Canon U.S.A. Inc., IP Division

(57) ABSTRACT

An ink set for an aqueous ink jet includes a first ink and a second ink, in which the first ink satisfies requirement 1 and requirement 2 described below:

requirement 1: the first ink contains a coloring material, a fluorinated surfactant, and a specific salt, and requirement 2: the difference between the dynamic surface tensions of the first ink at lifetimes of 50 msec and 5000 msec measured by a maximum bubble pressure method at 25° C. is 17 mN/m or more, and the dynamic surface tension of the first ink at a lifetime of 5000 msec is 32 mN/m or less.

14 Claims, No Drawings

INK SET AND INK JET RECORDING METHOD

BACKGROUND OF THE INVENTION

1. Field of the Invention

The present invention relates to an ink jet ink set and an ink jet recording method.

2. Description of the Related Art

Recording can be made on various recording media by an ink jet recording method. To produce better images, various inks, such as inks suitable to record photo-quality images on glossy paper and so forth and inks suitable to record documents on plain paper and so forth, have been reported for any purpose.

In recent years, the ink jet recording method also has been employed to print business documents including characters and diagrams on, for example, plain paper as a recording medium. The ink jet recording method has become increasingly employed for such applications. In such applications, importance is placed on the high-speed printing of clear images on a recording medium, such as plain paper. Thus, inks are required to provide an image having an excellent optical density, to have high drying speed (good fixability), and to be able to reduce bleeding between inks.

To solve these technical problems, proposals focused on the relationship of the physical properties between a plurality of inks are made (see Japanese Patent Laid-Open Nos. 2008-308664 and 2004-338392). Japanese Patent Laid-Open No. 2008-308664 discloses a set of a pigment ink containing a salt of a monovalent anion and a pigment to raise the dynamic surface tension at a lifetime of 50 msec and a dye ink. The document also states that ink droplets are present on a surface of a recording medium and that the destabilization of the dispersion state of the pigment is promoted by the effect of the salt while water evaporates, to aggregate the pigment, thereby providing a high optical density. Furthermore, the document states that the aggregation of the pigment is less likely to be mixed with the dye ink, thus improving the bleeding resistance. Japanese Patent Laid-Open No. 2004-338392 discloses that an ink set specifies the relationship of the contact angle of a plurality of inks that can react with each other so as not to easily mix the plurality of inks together. The document also states that a fluorinated surfactant is incorporated into one ink in order to satisfy the relationship of the contact angle, thereby increasing the water repellency of a region of a recording medium to which the ink is applied and inhibiting the spreading of the other ink to be applied to the region.

Moreover, proposals regarding the incorporation of fluorinated surfactants into inks are made (see Japanese Patent Laid-Open Nos. 2003-335987 and 2001-335725). Japanese Patent Laid-Open No. 2003-335987 discloses that even when the viscosity of an ink is increased in order to reduce bleeding, a decrease in the surface tension of the ink with a fluorinated surfactant having a specific structure ensures the ejection stability of the ink and improves the drying properties of an image. Japanese Patent Laid-Open No. 2001-335725 discloses that the incorporation of a fluorinated surfactant into an ink used for the recording on glossy paper reduces the solidification of the ink in a recording head and the bleeding of an image and shortens the drying time.

SUMMARY OF THE INVENTION

Accordingly, an embodiment of the present invention provides an ink set suitable for high-speed printing of an image which has a high optical density and which inhibits the occurrence of bleeding, and an ink jet recording method using the ink set.

One disclosed aspect of the present invention provides an ink set for an aqueous ink jet including a first ink and a second ink, in which the first ink satisfies requirement 1 and requirement 2 described below:

requirement 1: the first ink contains a coloring material, a fluorinated surfactant, and a salt, in which the salt is constituted by combining a cation and an anion, the cation being at least one selected from the group consisting of an alkali metal ion, an ammonium ion, and an organic ammonium ion, and the anion being at least one selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$, and requirement 2: the difference between the dynamic surface tensions of the first ink at lifetimes of 50 msec and 5000 msec measured by a maximum bubble pressure method at 25° C. is 17 mN/m or more, and the dynamic surface tension of the first ink at a lifetime of 5000 msec is 32 mN/m or less.

Further features of the present invention will become apparent from the following description of exemplary embodiments.

DESCRIPTION OF THE EMBODIMENTS

The inventors have conducted studies and have found that as described in Japanese Patent Laid-Open Nos. 2008-308664 and 2004-338392, improvements in the optical density and the fixability of an image and a reduction in bleeding are achieved to some extent by controlling the physical properties, such as the dynamic surface tension and the contact angle, of the ink. However, the inventors also have found that even when this method is employed, levels required in recent years are not satisfied.

Meanwhile, as described in Japanese Patent Laid-Open Nos. 2003-335987 and 2001-335725, even when a technique for selecting the type of surfactant incorporated into an ink is used, it is impossible to completely satisfy improvements in the optical density and the fixability of an image and a reduction in bleeding. That is, in Japanese Patent Laid-Open Nos. 2003-335987 and 2001-335725, the bleeding resistance can be improved because the permeability of the ink is increased with the fluorinated surfactant to inhibit contact between liquid inks on a surface of a recording medium. However, in this method, the coloring material in the ink also sinks rapidly in the recording medium. Thus, although the fixability of an image is improved, the optical density is markedly reduced.

The present invention will be described in detail below by way of preferred embodiments. Dynamic surface tension used in an embodiment of the present invention refers to a value measured by a maximum bubble pressure method (details will be given below) at 25° C. An ink set for an aqueous ink jet is just described as an "ink set", in some cases.

To rapidly record an image having a high optical density and inhibiting the occurrence of bleeding, there is a technique for using a reaction liquid (a liquid containing a reactant, for example, a polyvalent metal salt or an organic acid) to react with an ink, separately from the ink containing a coloring material. However, in this case, it is necessary to prepare the reaction liquid separately from the ink and arrange a unit configured to apply the reaction liquid. This is likely to lead to increases in cost and the complexity of an ink jet recording apparatus.

The inventors have conducted studies to satisfy the foregoing properties by devising an ink composition without using such a reaction liquid and have found that it is effective to control the dynamic surface tension of a salt-containing ink with a specific surfactant (polyoxyethylene alkyl ether) as described in Japanese Patent Laid-Open No. 2008-308664. Details are described below.

In the early stage of the lifetime (at 50 msec when the dynamic surface tension is measured by the maximum bubble pressure method, the same applies hereinafter), a high dynamic surface tension of the ink results in the inhibition of the permeation of the ink applied to a recording medium. An aqueous medium, such as water, evaporates while droplets of the ink are present on a surface of a recording medium. During that time, a coloring material aggregates by the action of the salt (electrolyte). The aggregates are efficiently present on the surface of the recording medium, thus improving the optical density of an image. Furthermore, the aggregation of the coloring material occurs rapidly. Thus, the mixing of the inks immediately after the application of a plurality of inks to the recording medium is inhibited, thereby improving the bleeding resistance.

Then the dynamic surface tension of the ink is lowered with time. The dynamic surface tension of the ink is lowered in the later stage of the lifetime (5000 msec when the dynamic surface tension is measured by the maximum bubble pressure method, the same applies hereinafter). This allows the aqueous medium in the ink to be rapidly absorbed into the recording medium to promote solid-liquid separation, thereby improving the fixability of an image. When the fixability of an image is improved as described above, the coloring material is less likely to be detached even if an image is touched immediately after recording. Thus, the ink set may be applied to high-speed printing.

As described above, it is useful to control the dynamic surface tension of the ink. Thus, the inventors have conducted more detailed studies on the technique described in Japanese Patent Laid-Open No. 2008-308664 and have found that when the dynamic surface tensions of at least one ink (first ink) included in an ink set at lifetimes of 50 msec and 5000 msec and the relationship therebetween are controlled as described below, the optical density, the bleeding resistance and the fixability are further improved, in some cases. Specifically, the inventors have found that in the case where the difference between the dynamic surface tensions of the ink at 50 msec and 5000 msec measured by the maximum bubble pressure method is 17 mN/m or more and where the dynamic surface tension at a lifetime of 5000 msec is 32 mN/m or less, the foregoing properties are improved, in some cases.

However, the inventors have also found that this does not satisfy a level required in these days, in some cases. The inventors have further conducted studies and have led to the conclusion that in order to satisfy the foregoing dynamic surface tension, it is necessary to select a fluorinated surfactant as a component contained in an ink. That is, it is necessary to satisfy requirement 1 in which at least one ink included in an ink set (first ink) contains a coloring material, a fluorinated surfactant, and a specific salt, and requirement 2 described above.

In an embodiment of the present invention, the coloring material, the fluorinated surfactant, and the salt, which also serve as components necessary to satisfy requirement 2, are contained while the dynamic surface tension of the ink is controlled to satisfy requirement 2 described above. In this case, these three components interact with one another to provide a pronounced effect of forming an image having an optical density, bleeding resistance, and fixability with levels required in these days. A mechanism, presumed by the inventors, for providing the foregoing effect is described below with a focus on interactions among the three components.

An interaction between the fluorinated surfactant and the salt is described below. Here, the dynamic surface tension used to specify the properties of an ink according to an embodiment of the present invention is determined by the maximum bubble pressure method. The maximum bubble pressure method is a method in which the maximum pressure needed to release a bubble formed at the tip of a probe (capillary tube) immersed in a target liquid is measured and the surface tension of the liquid is determined from the maximum pressure. The maximum pressure is measured while bubbles are continuously formed at the tip of the probe. The time from when the surface of a new bubble is generated at the tip of the probe to when the maximum bubble pressure (the point when the radius of curvature of the bubble is equal to the radius of the tip portion of the probe) is reached is referred to as a "lifetime".

That is, the maximum bubble pressure method is a method for measuring a surface tension a liquid in a dynamic state. From the measurement principle, the dynamic surface tension of the ink correlates with the orientation speed of the molecules of the surfactant in the ink toward a newly generated gas-liquid interface, i.e., the ease of the orientation of the surfactant to the gas-liquid interface. A change in the dynamic surface tension of the liquid with the lifetime reflects a change in surface tension in the process of gradually stopping the motion of the liquid, for example, the process from the application of the ink to the recording medium to permeation of the ink.

The results of the studies by the inventors demonstrated that in an ink containing certain types of fluorinated surfactant and salt, the orientation speed of the fluorinated surfactant to the gas-liquid interface is reduced in a short time scale by interaction with the salt and that the initial dynamic surface tension is easily maintained at a high level. The reason this phenomenon occurs is speculated as follows.

In the ink containing the salt, the surfactant is unevenly present by the effect of the salt (electrolyte) and reveals a certain degree of concentration distribution. In the case of a surfactant, such as polyoxyethylene alkyl ether, which is not a fluorinated surfactant, as used in Japanese Patent Laid-Open No. 2008-308664, the salt in the ink does not significantly affect the distribution state of the surfactant. Accordingly, a phenomenon called "positive adsorption" occurs even in a state in which the ink moves. Some of molecules of the surfactant at the gas-liquid interface are aligned to provide the surface activity, thereby leading to a relatively low dynamic surface tension in the early stage.

In contrast, for a certain type of fluorinated surfactant, the presence of the salt allows a phenomenon called "negative adsorption" to occur in a state in which the ink moves. The molecules of the surfactant are easily orientated not at the gas-liquid interface but in an ink droplet. Thus, the surface activity is not provided, leading to a relatively high dynamic surface tension in the early stage. Then negative adsorption of the fluorine-based by interaction with the salt is gradually changed to positive adsorption with the lifetime, so that the molecules are orientated at the gas-liquid interface, thereby rapidly lowering the dynamic surface tension of the ink in the later stage of the lifetime.

The fluorinated surfactant has high surface activity, compared with fluorine-free surfactants, such as polyoxyethylene alkyl ether. Thus, the use of the fluorinated surfactant results in a lower dynamic surface tension of the ink in the later stage of the lifetime. In addition, for the ink containing the fluorinated surfactant, a comparison of the ink free from the salt with the ink containing the salt reveals that the dynamic surface tension of the ink containing the salt at a lifetime of 5000 msec is likely to be lower than that of the ink free from the salt. The reason for this is unclear, but is believed that the presence of the salt allows a larger number of the molecules of the fluorinated surfactant to be orientated at the gas-liquid interface. The dynamic surface tension of the ink is lowered in the later stage of the lifetime, thereby markedly improving the fixability of an image.

It is very important for an embodiment of the present invention to control the dynamic surface tension of the ink by a combination of the salt and the fluorinated surfactant, which interact with each other. This combination easily results in a further increase in the difference between the dynamic surface tension in the early stage and that in the later stage of the lifetime, compared with a known combination of a surfactant and a salt. Furthermore, the combination easily results in a decrease in dynamic surface tension in the later stage of the lifetime. In other words, the combination easily satisfies requirement 2, thus easily providing the effect of an embodiment of the present invention.

Here, in order to satisfy requirement 2, polyoxyethylene alkyl ether can also be used as described in Japanese Patent Laid-Open No. 2008-308664. However, as described above, the use of the interaction between the fluorinated surfactant and the salt can satisfy requirement 2 in a small amount of the fluorinated surfactant, compared with polyoxyethylene alkyl ether. Thus, the use of the interaction is advantageous also from the viewpoint of, for example, the storage stability of the ink. Depending on the type of coloring material and the dissolution and dispersion states of the coloring material, when the polyoxyethylene alkyl ether content is set so as to satisfy requirement 2, the molecules of the surfactant present near the coloring material are increased, so that the dissolution and dispersion states of the coloring material can be liable to be unstable. Meanwhile, the coloring material aggregation-promoting effect of the salt (electrolyte) is affected by the distance between the coloring material molecules. When the action of polyoxyethylene alkyl ether is not balanced with the action of the salt, the coloring material is liable to be aggregated in the ink to reduce the storage stability of the ink. In this regard, when the interaction between the fluorinated surfactant and the salt is used, a smaller amount of the surfactant is needed to satisfy requirement 2. Thus the problem of a reduction in the storage stability of the ink is less likely to occur.

The interaction between the salt and the coloring material will be described below. The mechanism in which the coloring material is aggregated by the action of the salt while the dynamic surface tension of the ink is high in the early stage is the same as described above. In an embodiment of the present invention, the ink satisfies requirement 2 owing to the interaction between the fluorinated surfactant and the salt. Thus, the dynamic surface tension in the early stage is more likely to be increased, and an increase in the time needed for the aggregation of the coloring material due to the salt is also easily ensured. Furthermore, it is possible to markedly improve the optical density and the bleeding resistance of an image in combination with the interaction between the coloring material and the fluorinated surfactant described below.

Finally, the interaction between the coloring material and the fluorinated surfactant will be described. The surfactant is a compound that has a hydrophobic group and a hydrophilic group in its structure and thus has surface activity. The hydrophobic group of the surfactant and a hydrophobic portion, such as carbon, of the coloring material, which is an organic compound, are attracted to each other by the hydrophobic interaction and thus are located close to each other. For example, a hydrophobic group of a hydrocarbon-based surfactant such as a polyoxyethylene alkyl ether or acetylene glycol-type which is commonly used for ink jet ink is a hydrocarbon group. Thus, such a surfactant is present close to the coloring material, so that the aggregation of the coloring material due to the salt is liable to be relatively inhibited. The fluorinated surfactant has a perfluoro group in addition to a hydrocarbon group serving as hydrophobic groups. The fluorine atom of the perfluoro group has a high electronegativity. Thus, the fluorinated surfactant has a higher affinity for water molecules than for the coloring material and is less likely to be present close to the coloring material. The aggregation of the coloring material due to the salt is not inhibited and occurs efficiently. Such an interaction between the coloring material and the fluorinated surfactant arises to markedly improve the optical density and the bleeding resistance of an image.

As has been described above, in an embodiment of the present invention, the dynamic surface tension of the ink is controlled so as to satisfy requirement 2. The interactions among the three components, i.e., the coloring material, the fluorinated surfactant, and the salt, which serve as components needed to satisfy requirement 2, in the ink are used. That is, in an embodiment of the present invention, the first ink simultaneously satisfies both requirements 1 and 2 to provide a pronounced effect of forming an image with an optical density, bleeding resistance, and fixability at levels required in these days.

Ink Set

An ink set according to an embodiment of the present invention includes a combination of the first ink and a second ink different from the first ink, the first ink satisfying requirement 1 and requirement 2 described below:

requirement 1: the ink contains the coloring material, the fluorinated surfactant, and the specific salt described below, and requirement 2: the dynamic surface tension of the ink at a lifetime of 5000 msec is 32 mN/m or less, and a difference between the dynamic surface tensions of the ink at lifetimes of 50 msec and 5000 msec is 17 mN/m or more.

As is clear from the mechanism described above, when the second ink also satisfies requirements 1 and 2 described above, the optical density and the fixability of an image recorded with the second ink are also improved. Furthermore, higher bleeding resistance can also be achieved. According to a more preferred embodiment of the present invention, both the first and second inks may satisfy the requirements 1 and 2. In the case where both the inks according to the more preferred embodiment are used, a further high effect can be provided.

The hues of the first ink and the second ink constituting the ink set according to an embodiment of the present invention are not particularly limited and may be the same or different from each other. The hue of each of the inks may be appropriately selected from black, cyan, magenta, yellow, red, green, blue, and so forth. In the case where the inks have the same hue as each other, the inks are classified into the same category in the range of the hues classified as described above. In the case where the inks have different hues, the inks are classified into different hues in the range of the hues classified as described above. In addition, in the case where the inks have the same hue, the inks may have different color densities, i.e., the ink set may include a combination of a dark-color ink and a light-color ink.

In an embodiment of the present invention, the first ink and the second ink may have different hues from each other.

Furthermore, one of the inks may be a black ink, and the other may be a color ink (ink having a hue of, for example, cyan, magenta, yellow, red, green, or blue). In this case, bleeding is easily noticeable. However, the bleeding resistance is improved even in this case because the first ink satisfies requirements 1 and 2.

Properties of the dynamic surface tension of the inks constituting the ink set according to an embodiment of the present invention and components that may be used in the inks will be described below.

Properties of Dynamic Surface Tension

The first ink needs to satisfy requirement 2 in which the difference between the dynamic surface tensions at lifetimes of 50 msec and 5000 msec is 17 mN/m or more and in which the dynamic surface tension at a lifetime of 5000 msec is 32 mN/m or less.

A high dynamic surface tension in the early stage easily ensures a long time needed for the aggregation of the coloring material due to the salt, thereby resulting in an image with a higher optical density. Thus, the dynamic surface tension of the first ink at a lifetime of 50 msec may be 50 mN/m or more.

An excessively large difference between the dynamic surface tension in the early stage and that in the later stage of the lifetime results in a marked decrease in dynamic surface tension in the later stage of the lifetime. In this situation, even in the case of an ink which has a high dynamic surface tension in the early stage and easily improves the optical density of an image, the aggregated coloring material sinks into the recording medium with rapid permeation of an aqueous medium into a recording medium, thereby slightly reducing the optical density, in some cases. Accordingly, the difference between the dynamic surface tensions of the first ink at lifetimes of 50 msec and 5000 msec may be 23 mN/m or less.

The static surface tension of each of the inks constituting the ink set at 25° C. may be comparable to those of common ink jet inks and may be, for example, 25 mN/m or more and 65 mN/m or less. Note that "surface tension" just described in documents and so forth in this technical field usually indicates "static surface tension" measured by the principle of, for example, the Wilhelmy method (plate method) and is a physical property different from the "dynamic surface tension" used in an embodiment of the present invention.

Coloring Material

Examples of the coloring material include dyes, such as direct dye, acid dye, basic dye, disperse dye, and edible dye; and pigments, such as inorganic pigment and organic pigment. The ink preferably has a coloring material content of 0.1% by mass or more and 15.0% by mass or less and more preferably 1.0% by mass or more and 10.0% by mass or less with respect to the total mass of the ink.

In an embodiment of the present invention, a pigment may be used as the coloring material from the viewpoint of the fastness properties and the optical density of an image to be formed. A dye may be used in combination with the pigment in order to, for example, adjust the color tone of the ink and improve the dispersibility of the pigment. With respect to the type of pigment, any known pigments may be used. Examples thereof include inorganic pigments, such as carbon black; and organic pigments, such as azo, phthalocyanine, and quinacridone.

With respect to dispersion systems of the pigment, for example, there is a resin-dispersed pigment with a resin serving as a dispersant; and a self-dispersible pigment in which a hydrophilic group is bonded to a surface of a pigment particle. Furthermore, there is a resin-bonded pigment in which an organic group including a polymer is chemically bonded to a surface of a pigment particle; and a microencapsulated pigment in which a surface of a pigment particle is covered with, for example, a resin. Needless to say, pigments with different dispersion systems may be used in combination. In particular, the self-dispersible pigment in which an anionic group is bonded to the surface of the pigment particle directly or via another atomic group, and the resin-dispersed pigment in which the resin serving as the dispersant is physically adsorbed on the surface of the pigment particle and the pigment particle is dispersed by the effect of the resin, may be used.

Examples of the self-dispersible pigment include pigment in which an anionic group, such as —COO($M_1$), —SO$_3$($M_1$), —PO$_3$H($M_1$), and —PO$_3$($M_1$)$_2$, is bonded to the surfaces of the pigment particle directly or via another atomic group (—R—). Examples of $M_1$ include a hydrogen atom; alkali metal, such as lithium, sodium, and potassium; ammonium (NH$_4$); and organic ammonium from methylamine, ethylamine, monoethanolamine, diethanolamine, and triethanolamine. In the case where an anionic group forms a salt, the salt in the ink may be partially or completely dissociated. Examples of the another atomic group (—R—) include a linear or branched alkylene group having 1 to 12 carbon atoms; an arylene group, such as a phenylene group or a naphthylene group; an amido group; a sulfonyl group; an amino group; a carbonyl group; an ester group; and an ether group; and a group formed by a combination of these groups.

Examples of the resin-dispersed pigment include the pigment in which a copolymer including a hydrophilic unit and a hydrophobic unit is used as the resin dispersant and in which the resin dispersant is allowed to be physically adsorbed on the surface of the pigment particle to disperse the pigment. Any known copolymer usable for ink jet inks may be used as the resin dispersant. Examples of the resin dispersant include the copolymer including the hydrophilic unit and the hydrophobic unit as described below. Examples of the hydrophilic unit include a unit derived from a hydrophilic monomer, such as (meth)acrylic acid and salts thereof. Examples of the hydrophobic unit include a unit derived from a hydrophobic monomer, such as styrene and derivatives thereof, an aromatic ring-containing monomer, e.g., benzyl (meth)acrylate, and an aliphatic group-containing monomer, e.g., (meth)acrylate. Each resin dispersant preferably has a weight-average molecular weight of 1,000 or more and 30,000 or less and more preferably 3,000 or more and 15,000 or less. The resin dispersant may have an acid value of 80 mgKOH/g or more and 250 mgKOH/g or less.

Fluorinated Surfactant

The ink according to an embodiment of the present invention contains the fluorinated surfactant. To satisfy the properties of the dynamic surface tension of the ink (requirement 2) specified in an embodiment of the present invention, it is important to use the salt in combination and appropriately determine the content and the type of fluorinated surfactant. The ink preferably has a fluorinated surfactant content (percent by mass) of 0.060% by mass or more and 1.000% by mass or less, more preferably 0.060% by mass or more and 0.100% by mass or less, and particularly preferably 0.060% by mass or more and 0.080% by mass or less with respect to the total mass of the ink. At a fluorinated surfactant content of less than 0.060% by mass, the properties of the dynamic surface tension of the ink (requirement 2) specified in an embodiment of the present invention may be less likely to be satisfied, depending on the type of fluorinated surfactant. A fluorinated surfactant content of more than 1.000% by mass results in excessively high permeability of the ink, thereby failing to achieve a sufficiently high optical density of an image, in some cases. An excessively high fluorinated surfactant content results in the deposition of the fluorinated surfactant on a surface where nozzles of a recording head are arranged, so that the irregular ejection of the ink is liable to occur. A fluorinated surfactant content of 0.100% by mass or less may be less likely to cause such a phenomenon. The fluorinated surfactant commonly exhibits excellent surface activity. It is thus possible to adjust the dynamic surface tension of the ink to a desired value by the use of a small amount of the fluorinated surfactant, compared with other surfactants commonly used for ink jet inks.

Examples of the fluorinated surfactant include a perfluoroalkyl carboxylic acid and a salt thereof [$C_xF_{2x+1}$—$(CH_2)_y$—COOM], a perfluoroalkyl ethylene oxide adduct [$C_xF_{2x+1}$—$(CH_2)_y$—$(OCH_2CH_2)_z$—OH], a perfluoroalkyl phosphate and a salt thereof [$C_xF_{2x+1}$—$(CH_2)_y$—O—$P(OM)_2$], and a perfluoroalkyl sulfonic acid and a salt thereof [$C_xF_{2x+1}$—$(CH_2)_y$—$SO_3M$].

In the case where the fluorinated surfactant used in an embodiment of the present invention has an excessively long hydrocarbon group (alkylene group) in a hydrophobic group, the fluorinated surfactant exhibits the same behavior as a hydrocarbon-based surfactant and is easily located close to the coloring material, so that the aggregation due to the salt is less likely to occur. Thus, the balance between the chain length of the perfluoro group and that of the alkylene group and the size of the molecular structure of the fluorinated surfactant may be selected so as to achieve high hydrophilicity. Accordingly, x, y, z, and M in each formula described above may be set as described below.

x represents the chain length of the perfluoro group and preferably represents 4 or more and 8 or less and more preferably 4 or more and 6 or less. When x is 3 or less, the hydrophilicity of the fluorinated surfactant is easily increased, so that the properties of the dynamic surface tension of the ink (requirement 2) specified in an embodiment of the present invention may be less likely to be satisfied, depending on a structure other than the perfluoro group. When x represents 9 or more, the hydrophobicity of the fluorinated surfactant is excessively high. In some cases, the fluorinated surfactant is deposited on the surface where the nozzles of the recording head are arranged, so that the irregular ejection of the ink is liable to occur. y represents the chain length of the alkylene group and may represent 1 or more and 6 or less. z represents the number of ethylene oxide groups and preferably represents 1 or more and 50 or less, more preferably 1 or more and 20 or less, and particularly preferably 1 or more and 10 or less. M's each independently represent a hydrogen atom, an alkali metal (e.g., lithium, sodium, or potassium), ammonium ($NH_4$), or an organic ammonium (derived from, for example, methylamine, ethylamine, monoethanolamine, diethanolamine, or triethanolamine).

In an embodiment of the present invention, among the fluorinated surfactants described above, at least one selected from the group consisting of a perfluoroalkyl carboxylic acid and a salt thereof and a perfluoroalkyl ethylene oxide adduct may be used. The reason for this is as follows: each of the fluorinated surfactants interacts significantly with the salt, so that the properties of the dynamic surface tension of the ink (requirement 2) specified in an embodiment of the present invention are easily satisfied, thus proving the effect of an embodiment of the present invention at a very high level. At least one of a perfluoroalkyl carboxylic acid and its salt may be used because the molecular structure is compact and the properties of the dynamic surface tension of the ink are particularly easily controlled.

Salt Constituted by Combining Cation and Anion

The ink according to an embodiment of the present invention contains a specific salt. In an embodiment of the present invention, it is possible to provide the foregoing effect only by the combination of the interaction between the salt and the coloring material and the interaction between the salt and the fluorinated surfactant. The salt is contained in the ink in order to increase the concentration of a solute (electrolyte) in the ink to promote the aggregation of the coloring material due to the interaction with the coloring material and the negative adsorption due to the interaction with the fluorinated surfactant. Thus, for this purpose, the concentration of the solute (electrolyte) in the ink, i.e., the total number of moles of an anion and a cation formed by the dissolution of the salt, is dominant rather than the types of anion and cation constituting the salt.

The salt contained in the ink according to an embodiment of the present invention is constituted by combining a cation and an anion. The cation is at least one selected from the group consisting of an alkali metal ion, an ammonium ion, and an organic ammonium ion. The anion is at least one selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$, The salt in the ink may be partially or completely dissociated.

The cation contained in the salt is a monovalent cation and is at least one selected from the group consisting of an alkali metal ion, an ammonium ion ($NH_4^+$) and an organic ammonium ion. Examples of the alkali metal ion include a lithium ion, a sodium ion, and a potassium ion. Examples of the organic ammonium ion include the cation derived from an alkylamine having 1 to 3 carbon atoms, such as methylamine and ethylamine; and an alkanolamine having 1 to 4 carbon atoms, such as monoethanolamine, diethanolamine, and triethanolamine.

Examples of the salt constituted by combining a cation and an anion include ($M_2$) Cl, ($M_2$)Br, ($M_2$)I, ($M_2$)ClO, ($M_2$) $ClO_2$, ($M_2$)$ClO_3$, ($M_2$)$ClO_4$, ($M_2$)$NO_2$, ($M_2$)$NO_3$, ($M_2$)$_2SO_4$, ($M_2$)$_2CO_3$, ($M_2$)$HCO_3$, $HCOO(M_2)$, $(COO(M_2))_2$, COOH $(COO(M_2))$, $CH_3COO(M_2)$, $C_2H_4(COO(M_2))_2$, $C_6H_5COO$ ($M_2$), $C_6H_4(COO(M_2))_2$, ($M_2$)$_3PO_4$, ($M_2$)$_2HPO_4$, and ($M_2$) $H_2PO_4$, wherein ($M_2$) represents a monovalent cation. In an embodiment of the present invention, among these salts, a salt of an anion having a carboxylic acid group and a salt of a sulfate ion may be used.

The ink preferably has a salt content (percent by mass) of 0.05% by mass or more and 2.0% by mass or less and more preferably 0.1% by mass or more and 1.5% by mass or less with respect to the total mass of the ink. At a salt content of less than 0.05% by mass, the properties of the dynamic surface tension of the ink (requirement 2) specified in an embodiment of the present invention may be less likely to be satisfied, depending on the type of fluorinated surfactant. At a salt content of more than 2.0% by mass, in some cases, the ejection characteristics of the ink are not sufficiently provided at a high level, depending on the type of salt.

Aqueous Medium

The ink according to an embodiment of the present invention is an aqueous ink containing at least water serving as an aqueous medium. The aqueous medium may further contain a water-soluble organic solvent. As the water, deionized water (ion-exchanged water) may be used. The ink may have a water content (percent by mass) of 50.0% by mass or more and 95.0% by mass or less with respect to the total mass of the ink.

As the water-soluble organic solvent, any solvents that have been commonly used for ink jet inks may be used. Specific examples of the solvents that may be used include monohydric or polyhydric alcohols, (poly)alkylene glycols, glycol ethers, nitrogen-containing polar compounds, and sulfur-containing polar compounds. One or more of the solvents may be used, as needed. In an embodiment of the present invention, a water-soluble organic solvent having a vapor pressure lower than water at 25° C. may be used. The ink may have a water-soluble organic solvent content (percent by mass) of 3.0% by mass or more and 50.0% by mass or less with respect to the total mass of the ink.

In an embodiment of the present invention, in particular, a nitrogen-containing polar compound, such as 2-pyrrolidone, may be used as the water-soluble organic solvent. In the case where the ink contains the water-soluble organic solvent, the solubility of the fluorinated surfactant is increased, thereby particularly easily producing the ink that satisfies requirement 2.

As described above, in order to satisfy the properties of the dynamic surface tension of the ink (requirement 2) specified in an embodiment of the present invention, it is important to use the salt in combination and appropriately determine the content and the type of fluorinated surfactant. However, when a large amount of the water-soluble organic solvent having high permeability is used, in particular, the value of the dynamic surface tension at a lifetime of 50 msec is liable to be low. As a result, the difference between the dynamic surface tensions at lifetimes of 50 msec and 5000 msec is liable to be small. Thus, when the water-soluble organic solvent having high permeability is used, the water-soluble organic solvent content may be strictly controlled. Examples of the water-soluble organic solvent having high permeability include monohydric alcohols, 1,2-alkanediol, and glycol ethers. Even in the case where a surfactant which has a three-dimensionally large structure and which is less likely to form a micelle is used, for the same reason as the water-soluble organic solvent having high permeability, attention needs to be paid in determining the surfactant content.

Additional Additive

The ink according to an embodiment of the present invention may optionally contain a polyhydric alcohol, e.g., trimethylolpropane or trimethylolethane, or a water-soluble organic compound, such as urea or a urea derivative, e.g., ethylene urea, which is a solid at normal temperature, in addition to the components described above. Furthermore, the ink according to an embodiment of the present invention may optionally contain various additives, such as a pH adjuster, an anticorrosive, a preservative, a fungicide, an antioxidant, a reducing inhibitor, an evaporation promoter, and a chelating agent.

Ink Jet Recording Method

An ink jet recording method according to an embodiment of the present invention is a method in which a plurality of inks are ejected from a recording head of an ink jet system to record an image on a recording medium. As the plurality of inks, the above-described first and second inks constituting the ink set according to an embodiment of the present invention are used. Methods for ejecting an ink include a method in which mechanical energy is applied to an ink and a method in which thermal energy is applied to an ink. In an embodiment of the present invention, in particular, a method for ejecting an ink by the application of thermal energy may be employed. A known ink jet recording method may be employed, except that the inks constituting the ink set according to an embodiment of the present invention are used.

To record an image on a recording medium having permeability, the foregoing ink according to an embodiment of the present invention may be used in light of the foregoing mechanism. Examples of the recording medium include glossy paper and plain paper. In particular, plain paper may be used. Needless to say, a recording medium that may be used in the ink jet recording method according to an embodiment of the present invention is not limited thereto.

EXAMPLES

The present invention will be described below in more detail by way of examples, comparative examples, and reference examples. The present invention is not limited to the following examples as long as it is within the scope of the present invention. With respect to the amount of a component, "%" and "part(s)" are on a mass basis, unless otherwise specified.

Preparation of Pigment Dispersion

Pigment Dispersion 1

A styrene/n-butyl acrylate/acrylic acid copolymer (composition (molar) ratio, 33:44:23), which is a water-soluble resin, was dissolved in ion-exchanged water with 1 neutralization equivalent of potassium hydroxide to prepare an aqueous solution of a resin dispersant, the aqueous solution having a resin content of 20.0%. The water-soluble resin had a weight-average molecular weight of 5,000 and an acid value of 125 mgKOH/g. A mixture of 15.0 parts of a pigment (C.I. Pigment Red 122), 30.0 parts of the aqueous solution of the resin dispersant, and 55.0 parts of water was charged into a bead mill containing zirconia beads and subjected to dispersion treatment for 1 hour. The mixture was subjected to centrifugal separation to remove coarse particles and subjected to pressure filtration with a microfilter (manufactured by Fujifilm Corporation) having a pore size of 3.0 μm. An appropriate amount of ion-exchanged water was added thereto to give pigment dispersion 1. The pigment dispersion 1 had a pigment content of 15.0% and a resin content of 6.0%.

Pigment Dispersion 2

To a solution of 2.5 g of concentrated hydrochloric acid dissolved in 5.5 g of water, 0.8 g of p-aminobenzoic acid was added while the solution was cooled to 5° C. A vessel containing the resulting solution was placed in an ice bath. The solution was stirred to maintain the temperature of the solution at 10° C. or lower. A solution of 0.9 g of sodium nitrite dissolved in 9 g of water at 5° C. was added thereto. After the resulting solution was stirred for another 15 minutes, 9 g of a pigment (carbon black) was added thereto under stirring. Then the mixture was stirred for another 15 minutes. After the resulting slurry was filtered through filter paper (trade name: normal filter paper No. 2, manufactured by Toyo Roshi Kaisha, Ltd.), particles were sufficiently washed with water and dried in an oven at 110° C. to prepare a self-dispersible pigment in which —$C_6H_4$—COONa groups were bonded to surfaces of particles of the pigment. An appropriate amount of ion-exchanged water was added thereto to give pigment dispersion 2. The pigment dispersion 2 had a pigment content of 15.0%.

Pigment Dispersion 3

A styrene/acrylic acid copolymer (composition (molar) ratio, 33:67), which is a water-soluble resin, was dissolved in ion-exchanged water with 1 neutralization equivalent of potassium hydroxide to prepare an aqueous solution of a resin dispersant, the aqueous solution having a resin content of 20.0%. The water-soluble resin had a weight-average molecular weight of 10,000 and an acid value of 200 mgKOH/g. A mixture of 15.0 parts of a pigment (carbon black), 30.0 parts of the aqueous solution of the resin dispersant, and 55.0 parts of water was charged into a sand grinder and subjected to dispersion treatment for 1 hour. The mixture was subjected to centrifugal separation to remove coarse particles and subjected to pressure filtration with a microfilter (manufactured by Fujifilm Corporation) having a pore size of 3.0 μm. An appropriate amount of ion-exchanged water was added thereto to give pigment dispersion 3. The pigment dispersion 3 had a pigment content of 15.0% and a resin content of 6.0%.

Surfactant

Structures of surfactants used for the preparation of inks are illustrated in Table 1. As an acetylene glycol ethylene oxide adduct, Acetylenol E100 (manufactured by Kawaken Fine Chemicals Co., Ltd.) was used.

TABLE 1

Table 1: Structure of surfactant

| | Structural formula |
|---|---|
| Salt of perfluoroalkyl carboxylic acid | $C_6F_{13}$—$(CH_2)_2$—COOLi |
| Perfluoroalkyl ethylene oxide adduct | $C_6F_{13}$—$(CH_2)_2$—$(OCH_2CH_2)_5$—OH |
| Salt of perfluoroalkyl phosphate | $C_8F_{17}$—$(CH_2)_2$—O—$PO(ONa)_2$ |
| Salt of perfluoroalkyl sulfonate | $C_6F_{13}$—$(CH_2)_2$—$SO_3NH_4$ |
| Acetylene glycol ethylene oxide adduct | — |
| Polyoxyethylene lauryl ether | $C_{12}H_{25}$—O—$(CH_2CH_2O)_9$—H |
| Polyoxyethylene isocetyl ether | $C_{16}H_{31}$—O—$(CH_2CH_2O)_{15}$—H |

Preparation of Ink

Components (unit: %) described in upper rows in Tables 2 to 4 were mixed. The resulting mixtures were sufficiently stirred and then subjected to pressure filtration with a cellulose acetate filter (manufactured by Toyo Roshi Kaisha, Ltd.) having a pore size of 1.20 μm to prepare inks. Inks 1 to 17 were magenta inks containing magenta pigments or dyes. Inks 18 to 38 were black inks containing carbon black.

The content of C.I. Acid Red 289 (expressed as [*]) in each of inks 5, 6, and 17 was set to a value such that each of inks 5, 6, and 17 had an absorbance comparable to those of other magenta inks each having a content of pigment dispersion 1 of 20.0%. In this case, the absorbance was measured as follows: The absorbance of liquids prepared by diluting the inks 2000 times with ion-exchanged water was measured in the wavelength range of 510 to 550 nm. The maximum value of the absorbance of each of the liquids was defined as the above-referenced absorbance. The "balance" of ion-exchanged water indicates the content of the difference of the ion-exchanged water such that the total amount of the ink composition is 100.0%.

The values of the dynamic surface tensions of the inks at lifetimes of 50 msec and 5000 msec and the values of the differences therebetween (expressed as Δ dynamic surface tension) are described in lower rows in Tables 2 to 4. The dynamic surface tensions of the inks were measured at 25° C. with an apparatus (Bubble Pressure Tensiometer BP2, manufactured by KRÜSS GmbH) for measuring a dynamic surface tension of a liquid by a maximum bubble pressure method.

TABLE 2

Table 2: Composition and properties of ink

| | Ink | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pigment dispersion 1 | 20.0 | 20.0 | 20.0 | 20.0 | | | 20.0 | 20.0 | 20.0 | 20.0 | 20.0 | 20.0 |
| C.I. Acid Red 289 | | | | | [*] | [*] | | | | | | |
| Pigment dispersion 2 | | | | | | | | | | | | |
| Pigment dispersion 3 | | | | | | | | | | | | |
| Salt of perfluoroalkyl carboxylic acid | 0.075 | 0.075 | 0.075 | | 0.075 | 0.075 | 0.075 | | | | 0.075 | |
| Perfluoroalkyl ethylene oxide adduct | | | | 0.270 | | | | 0.270 | 0.050 | | | 0.075 |
| Salt of perfluoroalkyl phosphate | | | | | | | | | | | | |
| Salt of perfluoroalkyl sulfonate | | | | | | | | | | | | |
| Acetylene glycol ethylene oxide adduct | | | | | | | | | | 1.000 | 1.000 | 1.000 |
| Polyoxyethylene lauryl ether | | | | | | | | | | | | |
| Polyoxyethylene isocetyl ether | | | | | | | | | | | | |
| Potassium phthalate | 1.0 | | | 1.0 | 0.5 | 1.0 | | | 1.0 | 1.0 | | 1.0 |
| Ammonium benzoate | | 1.0 | | | | | | | | | | |
| Sodium sulfate | | | 1.0 | | | | | | | | | |
| Glycerol | 5.0 | 5.0 | 5.0 | 5.0 | 5.0 | 5.0 | 5.0 | 5.0 | 5.0 | 5.0 | 5.0 | 5.0 |
| 2-Pyrrolidone | 5.0 | 5.0 | 5.0 | 5.0 | 5.0 | 5.0 | 5.0 | 5.0 | 5.0 | 5.0 | 5.0 | 5.0 |
| Polyethylene glycol (average molecular weight: 600) | 4.0 | 4.0 | 4.0 | 4.0 | 4.0 | 4.0 | 4.0 | 4.0 | 4.0 | 4.0 | 4.0 | 4.0 |
| Diethylene glycol monobutyl ether | | | | | | | | | | | | |
| Ion-exchanged water | 64.9 | 64.9 | 64.9 | 64.7 | balance | balance | 65.9 | 65.7 | 65.0 | 64.0 | 64.9 | 63.9 |
| Dynamic surface tension (50 msec) | 50 | 50 | 50 | 52 | 49 | 50 | 48 | 49 | 61 | 38 | 38 | 38 |
| Dynamic surface tension (5000 msec) | 30 | 30 | 30 | 24 | 32 | 32 | 36 | 25 | 47 | 31 | 31 | 31 |
| Δ dynamic surface tension | 20 | 20 | 20 | 28 | 17 | 18 | 12 | 24 | 14 | 7 | 7 | 7 |

TABLE 3

Table 3: Composition and properties of ink

| | Ink | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Pigment dispersion 1 | 20.0 | 20.0 | 20.0 | 20.0 | | | | | | | | |
| C.I. Acid Red 289 | | | | | [*] | | | | | | | |
| Pigment dispersion 2 | | | | | | 20.0 | 20.0 | 20.0 | 20.0 | | 20.0 | 20.0 |
| Pigment dispersion 3 | | | | | | | | | | 20.0 | | |
| Salt of perfluoroalkyl carboxylic acid | | | | | | 0.075 | 0.075 | 0.075 | | 0.075 | 0.075 | |
| Perfluoroalkyl ethylene oxide adduct | 0.075 | | | | | | | | | 0.270 | | 0.270 |
| Salt of perfluoroalkyl phosphate | | 0.150 | | | | | | | | | | |
| Salt of perfluoroalkyl sulfonate | | | 0.200 | 0.200 | | | | | | | | |
| Acetylene glycol ethylene oxide adduct | | | | | | | | | | | | |
| Polyoxyethylene lauryl ether | | | | | | | | | | | | |
| Polyoxyethylene isocetyl ether | | | | | 0.800 | | | | | | | |
| Potassium phthalate | 1.0 | 1.0 | 1.0 | | | 1.0 | | | 1.0 | 1.0 | | |
| Ammonium benzoate | | | | | | | 1.0 | | | | | |
| Sodium sulfate | | | | | | | | 1.0 | | | | |
| Glycerol | 5.0 | 5.0 | 5.0 | 5.0 | 5.0 | 5.0 | 5.0 | 5.0 | 5.0 | 5.0 | 5.0 | 5.0 |
| 2-Pyrrolidone | 5.0 | 5.0 | 5.0 | 5.0 | 5.0 | 5.0 | 5.0 | 5.0 | 5.0 | 5.0 | 5.0 | 5.0 |
| Polyethylene glycol (average molecular weight: 600) | 4.0 | 4.0 | 4.0 | 4.0 | 4.0 | 4.0 | 4.0 | 4.0 | 4.0 | 4.0 | 4.0 | 4.0 |
| Diethylene glycol monobutyl ether | 8.0 | | | | | | | | | | | |
| Ion-exchanged water | 56.9 | 64.9 | 64.8 | 65.8 | balance | 64.9 | 64.9 | 64.9 | 64.7 | 64.9 | 65.9 | 65.7 |
| Dynamic surface tension (50 msec) | 38 | 55 | 54 | 54 | 48 | 50 | 50 | 50 | 52 | 50 | 48 | 49 |
| Dynamic surface tension (5000 msec) | 31 | 43 | 52 | 52 | 35 | 30 | 30 | 30 | 24 | 30 | 36 | 25 |
| Δ dynamic surface tension | 7 | 12 | 2 | 2 | 13 | 20 | 20 | 20 | 28 | 20 | 12 | 24 |

TABLE 4

Table 4: Composition and properties of ink

| | Ink | | | | | | | | | | |
|---|---|---|---|---|---|---|---|---|---|---|---|
| | 25 | 26 | 27 | 28 | 29 | 30 | 31 | 32 | 33 | 34 | 35 |
| Pigment dispersion 1 | | | | | | | | | | | |
| C.I. Acid Red 289 | | | | | | | | | | | |
| Pigment dispersion 2 | 20.0 | 20.0 | 20.0 | 20.0 | 20.0 | 20.0 | 20.0 | 20.0 | 20.0 | 20.0 | 20.0 |
| Pigment dispersion 3 | | | | | | | | | | | |
| Salt of perfluoroalkyl carboxylic acid | | | | 0.075 | | | | | | | |
| Perfluoroalkyl ethylene oxide adduct | 0.050 | | | | 0.075 | 0.075 | | | | | |
| Salt of perfluoroalkyl phosphate | | | | | | | 0.150 | | | | |
| Salt of perfluoroalkyl sulfonate | | | | | | | | 0.200 | 0.200 | | |
| Acetylene glycol ethylene oxide adduct | | 1.000 | 0.200 | 1.000 | 1.000 | | | | | | |
| Polyoxyethylene lauryl ether | | | | | | | | | | 0.100 | 0.100 |
| Polyoxyethylene isocetyl ether | | | | | | | | | | | |
| Potassium phthalate | 1.0 | 1.0 | 1.0 | | 1.0 | 1.0 | 1.0 | 1.0 | | | |
| Ammonium benzoate | | | | | | | | | | | 1.0 |
| Sodium sulfate | | | | | | | | | | | |
| Glycerol | 5.0 | 5.0 | 5.0 | 5.0 | 5.0 | 5.0 | 5.0 | 5.0 | 5.0 | 5.0 | 5.0 |
| 2-Pyrrolidone | 5.0 | 5.0 | 5.0 | 5.0 | 5.0 | 5.0 | 5.0 | 5.0 | 5.0 | 5.0 | 5.0 |
| Polyethylene glycol (average molecular weight: 600) | 4.0 | 4.0 | 4.0 | 4.0 | 4.0 | 4.0 | 4.0 | 4.0 | 4.0 | 4.0 | 4.0 |
| Diethylene glycol monobutyl ether | | | | | | 8.0 | | | | | |

TABLE 4-continued

Table 4: Composition and properties of ink

| | Ink | | | | | | | | | | |
|---|---|---|---|---|---|---|---|---|---|---|---|
| | 25 | 26 | 27 | 28 | 29 | 30 | 31 | 32 | 33 | 34 | 35 |
| Ion-exchanged water | 65.0 | 64.0 | 64.8 | 64.9 | 63.9 | 56.9 | 64.9 | 64.8 | 65.8 | 65.9 | 64.9 |
| Dynamic surface tension (50 msec) | 61 | 38 | 41 | 38 | 38 | 38 | 55 | 54 | 54 | 51 | 51 |
| Dynamic surface tension (5000 msec) | 47 | 31 | 34 | 31 | 31 | 31 | 43 | 52 | 52 | 32 | 32 |
| Δ dynamic surface tension | 14 | 7 | 7 | 7 | 7 | 7 | 12 | 2 | 2 | 19 | 19 |

Evaluation

Combinations of ink A and ink B described in Table 5 were used as ink sets. The inks constituting the ink sets were charged into ink cartridges. The ink cartridges were mounted on an ink jet recording apparatus (PIXUS MX7600, manufactured by CANON KABUSHIKI KAISHA) including a recording head configured to eject the inks by the effect of thermal energy. In this example, when two ink droplets each having a volume of 5.5 pL are applied to a unit area of 1/600 inches×1/600 inches to form a solid image with a resolution of 600 dpi×600 dpi, the solid image is defined as "a recording duty of 100%". Images used for evaluations were recorded on a recording medium (plain paper) (PBPAPER GF-500, manufactured by CANON KABUSHIKI KAISHA) with the ink jet recording apparatus in an environment with a temperature of 23° C. and a relative humidity of 55% to produce recorded articles. In the present invention, with respect to evaluation criteria of the following items, C indicates an unacceptable level, and (AA), A, and B each indicate an acceptable level. The evaluation results are described in Table 5.

In Table 5, Y indicates that an ink included in an ink set satisfies requirements 1 and 2, N indicates that an ink does not satisfy at least one of requirements 1 and 2. That is, each ink expressed as Y corresponds to the first ink according to an embodiment of the present invention. In the case where both inks constituting an ink set are expressed as Y, the second ink also satisfies requirements 1 and 2.

Optical Density

To evaluate the optical density, recorded articles having a solid image with a recording duty of 200% were used. The recorded articles were dried for 24 hours in an environment with a temperature of 23° C. and a relative humidity of 55%. Then the optical density of the solid image in the each of the recorded articles was measured with a spectrophotometer (Spectrolino, manufactured by Gretag Macbeth) using a light source D50 at a field of view of 2° to evaluate the optical density. The evaluation criteria are described below. The reason the evaluation criteria are provided for each ink color is that in the visual properties of human beings, there is a difference in acceptable level between black and color.

Evaluation Criteria for Color Ink
A: The optical density was 1.20 or more.
B: The optical density was 1.15 or more and less than 1.20.
C: The optical density was 1.15 or less.
Evaluation criteria for black ink
A: The optical density was 1.50 or more.
B: The optical density was 1.40 or more and less than 1.50.
C: The optical density was less than 1.40.

Fixability

To evaluate the fixability, recorded articles having a solid image with a recording duty of 100% were used. At 10 seconds after recording, silbon paper and a weight having a contact pressure of 40 g/cm² were placed on a portion of the solid image of each of the recorded articles. Then the solid image was rubbed with the silbon paper. The degree of smearing on an unrecorded portion of each recorded article was visually checked to evaluate the fixability. The evaluation criteria are described below. Note that in the case where an ink is tested by such an evaluation method and found to have acceptable fixability, the results demonstrate that the ink is rapidly dried and can be applied to high-speed printing.
A: The unrecorded portion of the recorded article was not smeared.
B: The unrecorded portion of the recorded article was slightly smeared.
C: The unrecorded portion of the recorded article was clearly smeared.

Bleeding Resistance

To evaluate the bleeding resistance, recorded articles having a pattern were used, the pattern including a solid image of a black ink having a recording duty of 150% adjacent to a solid image of a color ink having a recording duty of 100%. The resulting recorded articles were dried in an environment with a temperature of 23° C. and a relative humidity of 55% for 24 hours. Then the boundary between the solid images was visually checked to evaluate the bleeding resistance. The evaluation criteria are described below.
AA: Bleeding did not occur.
A: Bleeding occurred slightly.
B: Although bleeding occurred, the boundary between the solid images was clear.
C: Bleeding occurred, and the boundary between the solid images was not recognized.

TABLE 5

Table 5: Evaluation results

| | | Ink A | | | | Ink B | | | | |
|---|---|---|---|---|---|---|---|---|---|---|
| | | Ink No. | Requirement 1, 2 | Optical density | Fixability | Ink No. | Requirement 1, 2 | Optical density | Fixability | Bleeding resistance |
| Example | 1 | 1 | Y | A | A | 18 | Y | A | A | AA |
| | 2 | 4 | Y | B | A | 21 | Y | B | A | AA |
| | 3 | 1 | Y | A | A | 21 | Y | B | A | AA |

TABLE 5-continued

Table 5: Evaluation results

| | | Ink A | | | | Ink B | | | |
|---|---|---|---|---|---|---|---|---|---|
| | | Ink No. | Requirement 1, 2 | Optical density | Fixability | Ink No. | Requirement 1, 2 | Optical density | Fixability | Bleeding resistance |
| | 4 | 1 | Y | A | A | 22 | Y | A | A | AA |
| | 5 | 2 | Y | A | A | 19 | Y | A | A | AA |
| | 6 | 3 | Y | A | A | 20 | Y | A | A | AA |
| | 7 | 2 | Y | A | A | 18 | Y | A | A | AA |
| | 8 | 5 | Y | B | A | 21 | Y | B | A | AA |
| | 9 | 6 | Y | B | A | 21 | Y | B | A | AA |
| | 10 | 1 | Y | A | A | 25 | N | A | C | A |
| | 11 | 1 | Y | A | A | 31 | N | B | B | A |
| | 12 | 1 | Y | A | A | 32 | N | B | C | A |
| | 13 | 9 | N | A | C | 21 | Y | B | A | A |
| | 14 | 14 | N | B | B | 21 | Y | B | A | A |
| | 15 | 15 | N | B | C | 21 | Y | B | A | A |
| | 16 | 6 | Y | B | A | 27 | N | C | A | B |
| | 17 | 4 | Y | B | A | 26 | N | C | A | B |
| Comparative example | 1 | 9 | N | A | C | 25 | N | A | C | C |
| | 2 | 10 | N | C | A | 26 | N | C | A | C |
| | 3 | 11 | N | C | A | 28 | N | C | A | C |
| | 4 | 14 | N | B | B | 32 | N | B | C | C |
| | 5 | 8 | N | B | B | 24 | N | B | B | C |
| | 6 | 12 | N | C | A | 29 | N | C | A | C |
| | 7 | 13 | N | C | A | 30 | N | B | A | C |
| | 8 | 7 | N | B | B | 23 | N | B | B | C |
| | 9 | 16 | N | B | C | 33 | N | B | C | C |
| | 10 | 12 | N | C | A | 26 | N | C | A | C |
| | 11 | 13 | N | C | A | 26 | N | C | A | C |
| | 12 | 7 | N | B | B | 26 | N | C | A | C |
| | 13 | 10 | N | C | A | 23 | N | B | B | C |
| | 14 | 10 | N | C | A | 33 | N | B | C | C |
| Reference example | 1 | 17 | N | C | B | 34 | N | C | A | B |
| | 2 | 17 | N | C | B | 35 | N | C | A | B |

As is apparent from Table 5, the (first) inks each satisfying requirements 1 and 2 were suitable for high-speed printing of an image with a high optical density. It was possible to record the images each inhibiting the occurrence of bleeding by using the ink sets each including the (first) ink. For the inks 4, 8, 21, and 24, the fluorinated surfactants were deposited on a surface where nozzles of the recording head were arranged, thereby leading to the slight irregular ejection of the inks.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-139663 filed Jun. 21, 2012, which is hereby incorporated by reference herein in its entirety.

What is claimed is:

1. An ink set for an aqueous ink jet comprising:
a first ink; and
a second ink,
wherein the first ink satisfies requirement 1 and requirement 2 described below:
requirement 1: the first ink comprises a coloring material, a fluorinated surfactant, and a salt,
wherein the salt is constituted by combining a cation and an anion, the cation being at least one selected from the group consisting of an alkali metal ion, an ammonium ion, and an organic ammonium ion, and the anion being at least one selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$; and
requirement 2: the difference between the dynamic surface tensions of the first ink at lifetimes of 50 msec and 5000 msec measured by a maximum bubble pressure method at 25° C. is 17 mN/m or more, and the dynamic surface tension of the first ink at a lifetime of 5000 msec is 32 mN/m or less.

2. The ink set according to claim 1,
wherein in requirement 2, the dynamic surface tension at a lifetime of 50 msec is 50 mN/m or more.

3. The ink set according to claim 1,
wherein in requirement 2, the difference between the dynamic surface tensions at lifetimes of 50 msec and 5000 msec is 23 mN/m or less.

4. The ink set according to claim 1,
wherein the fluorinated surfactant is at least one selected from the group consisting of a perfluoroalkyl carboxylic acid and a salt thereof and a perfluoroalkyl ethylene oxide adduct.

5. The ink set according to claim 1,
wherein the coloring material comprises a pigment.

6. The ink set according to claim 1,
wherein the second ink satisfies requirement 1 and requirement 2.

7. An ink jet recording method comprising:
ejecting a plurality of inks from a recording head of an ink jet system to perform recording on a recording medium,
wherein the first ink and the second ink constituting the ink set according to claim 1 are used as the plurality of inks.

8. The ink set according to claim 1, wherein the content (percent by mass) of the fluorinated surfactant is 0.060% by mass or more and 1.000% by mass or less with respect to the total mass of the ink.

9. The ink set according to claim 1, wherein the content (percent by mass) of the fluorinated surfactant is 0.060% by mass or more and 0.100% by mass or less with respect to the total mass of the ink.

10. The ink set according to claim 1, wherein the content (percent by mass) of the fluorinated surfactant is 0.060% by mass or more and 0.080% by mass or less with respect to the total mass of the ink.

11. The ink set according to claim 1, wherein the content (percent by mass) of the salt is 0.05% by mass or more and 2.0% by mass or less with respect to the total mass of the ink.

12. The ink set according to claim 1, wherein the fluorinated surfactant is a perfluoroalkyl ethylene oxide adduct.

13. The ink set according to claim 5, wherein the pigment comprises a self-dispersible pigment.

14. The ink set according to claim 6, wherein the colorant comprises at least one of a dye and a pigment.

* * * * *